(12) United States Patent
Sun et al.

(10) Patent No.: US 8,463,065 B2
(45) Date of Patent: Jun. 11, 2013

(54) LINEAR FEATURE DETECTION METHOD AND APPARATUS

(75) Inventors: Changming Sun, Marsfield (AU); Pascal Vallotton, North Epping (AU)

(73) Assignee: Commonwealth Scientific and Industrial Research Organisation, Campbell (AU)

( * ) Notice: Subject to any disclaimer, the term of this patent is extended or adjusted under 35 U.S.C. 154(b) by 1227 days.

(21) Appl. No.: 12/086,180

(22) PCT Filed: Dec. 7, 2006

(86) PCT No.: PCT/AU2006/001863
§ 371 (c)(1),
(2), (4) Date: Jun. 6, 2008

(87) PCT Pub. No.: WO2007/065221
PCT Pub. Date: Jun. 14, 2007

(65) Prior Publication Data
US 2009/0154792 A1    Jun. 18, 2009

(30) Foreign Application Priority Data

Dec. 7, 2005 (AU) ............................... 2005906878

(51) Int. Cl.
*G06K 9/40* (2006.01)
(52) U.S. Cl.
USPC ........................................................ 382/260
(58) Field of Classification Search
USPC ................. 348/666; 382/116, 123, 190, 202, 382/260, 264, 275, 284
See application file for complete search history.

(56) References Cited

U.S. PATENT DOCUMENTS

| | | | | |
|---|---|---|---|---|
| 4,551,753 | A * | 11/1985 | Nishizawa et al. | 348/446 |
| 5,835,620 | A * | 11/1998 | Kaplan et al. | 382/133 |
| 5,871,019 | A * | 2/1999 | Belohlavek | 600/450 |
| 6,094,508 | A | 7/2000 | Acharya et al. | |
| 2004/0037465 | A1 * | 2/2004 | Krause | 382/199 |
| 2004/0151356 | A1 * | 8/2004 | Li et al. | 382/131 |

OTHER PUBLICATIONS

International Search Report for PCT/AU2006/001863 mailed Feb. 7, 2007.
Written Opinion for PCT/AU2006/001863 mailed Feb. 7, 2007.
Boland, M.V., et al., "A neural network classifier capable of recognizing the patterns of all major subcellular structures in fluorescence microscope images of HeLa cells.", *Bioinformatics*, 17(12):1213-1223 (2001).
Can, A., et al., "Rapid automated tracing and feature extraction from retinal fundus images using direct exploratory algorithms.", *IEEE Transactions on Information Technology in Biomedicine*, 3(2):125-138 (1999).
Chauduri, S., et al., "Detection of blood vessels in retinal images using two-dimensional matched filters.", *IEEE Transactions on Medical Imaging*, 8(3):263-269 (1989).

* cited by examiner

*Primary Examiner* — Gregory F Cunningham
(74) *Attorney, Agent, or Firm* — Nixon & Vanderhye P.C.

(57) ABSTRACT

A method of extracting linear features from an image, the method including the steps of: (a) applying a non maximum suppression filter to the image for different angles of response to produce a series of filtered image responses; (b) combining the filtered image responses into a combined image having extracted linear features.

42 Claims, 22 Drawing Sheets (a) Input Image (b) Result A (c) Result B (a)Input Image (b)Union of Result A and Result B (a)

(b)

(a)

(b)

| Image size | Rank filter | NMS algorithm |
|---|---|---|
| 512 x 512 | 1.72 | 0.30 |
| 1336 x 1206 | 10.72 | 1.90 |
| Average for 93 images | 445.00 | 79.29 |

Computational running time in seconds

Figure 14

| Image size | 2 | 4 | 8 |
|---|---|---|---|
| 512 x 512 | 0.25 | 0.34 | 0.58 |
| 1280 x 1024 | 0.63 | 0.72 | 1.01 |

Running times in seconds for different
numbers of directional filters used

LINEAR FEATURE DETECTION METHOD AND APPARATUS

This application is the U.S. national phase of International Application No. PCT/AU2006/001863 filed 7 Dec. 2006 which designated the U.S. and claims priority to Australian Patent Application No. 2005906878 filed 7 Dec. 2005, the entire contents of each of which are hereby incorporated by reference.

FIELD OF THE INVENTION

The present invention relates to methods of automated image analysis and in particular to computer methods for feature detection in an image.

The invention has been developed primarily for use as a method of linear feature detection for image analysis in computer vision and pattern recognition applications and will be described hereinafter with reference to this application. However it will be appreciated that the invention may not limited to this particular field of use. Neurite outgrowth detection is one of the application examples.

BACKGROUND OF THE INVENTION

Any discussion of the prior art throughout the specification should in no way be considered as an admission that such prior art is widely known or forms part of the common general knowledge in the field. In particular the references cited throughout the in specification should in no way be considered as an admission that such art is prior art, widely known or forms part of the common general knowledge in the field.

Linear or elongated feature detection is a very important task in the areas of image analysis, computer vision, and pattern recognition. It has a very wide range of applications ranging from retinal vessel extraction, skin hair removal for melanoma detection, and fingerprint analysis in the medical and biometrics area, neurite outgrowth detection and compartment assay analysis in the biotech area as described in Ramm et al., Van de Wouwer et al. and Meijering et al. It is also used for characterizing, tree branches, tree bark, plant roots, and leaf vein/skeleton detection; and in the infrastructure areas for road crack detection, roads and valleys detection in satellite images as described in Fischler et al.

There are a number of techniques in the literature for linear feature detection. Quite a few are aimed at detecting retinal vessels. A recent review of some of the available vessel extraction techniques and algorithms can be found in Kirbas and Quek.

One type of extraction technique, such as that disclosed in Bamberger and Smith, requires a series of directional filters corresponding to the direction of the structures present in the image. Some of the methods employed there include steerable filters as described in Gauch and Pier, 2D matched filters as described in Chaudhuri et al., maximum gradient profiles as described in Colchester et al., and directional morphological filtering such as that used by Soille and Talbot. This type of techniques can be termed as either template or model-based and tend to be slow.

Another approach to linear feature detection uses the classical gradient/curvature or Hessian-based detectors. These techniques include the use of thin nets or crest lines as described in Monga et al., and ridges as described in Lang et al., Eberly, and Gauch and Pizer, and are also generally computationally expensive.

A further method of linear feature detection involves the use of tracking techniques such as stick growing as described in Nelson, and tracking as described in Can et al. and Tolias and Panas. The tracking based approach requires initial locations of linear features, which typically need user intervention. For example, methods using edge operators to detect pairs of edges and graph searching techniques to find the centrelines of vessel segments are presented in Fleagle et al. and Sonka et al. These methods require the user to identify the specific areas of interest. There are also other related techniques which are termed edge or "roof" based, such as those described in Zhou et al., Nevatia and Babu, and Canny. Other known feature detection algorithms include pixel classification using neural network scheme through supervised training as described in Staal, S-Gabor filter and deformable splines as described in Klein, and mathematical morphology as described in Zana and Klein.

REFERENCES

R. H. Bamberger and M. J. T. Smith. A filter bank for the directional decomposition of images: Theory and design. *IEEE Transactions on Signal Processing*, 40(4):882-893, April 1992.

M. V. Boland and R. F. Murphy. A neural network classifier capable of recognizing the patterns of all major subcellular structures in fluorescence microscope images of HeLa cells. *Bioinformatics*, 17(12):1213-1223, December 2001.

A. Can, H. Shen, J. N. Turner, H. L. Tanenbaum, and B. Roysam. Rapid automated tracing and feature extraction from retinal fundus images using direct exploratory algorithms. *IEEE Transactions on Information Technology in Biomedicine*, 3(2):125-138, June 1999.

J. Canny. Finding edges and lines in images. Technical Report AITR-720, MIT, Artificial Intelligence Laboratory, Cambridge, USA, June 1983.

S. Chaudhuri, S. Chatterjee, N. Katz; M. Nelson, and M. Goldbaum. Detection of blood vessels in retinal images using two-dimensional matched filters. *IEEE Transactions on Medical Imaging*, 8(3):263-269, September 1989.

A. C. F. Colchester, R. Ritchings, and N. D. Kodikara. Image segmentation using maximum gradient profiles orthogonal to edges. *Image and Vision Computing*, 8(3):211-217, August 1990.

D. Eberly. *Ridges in Inage and Data Analysis*. Kluwer Academic Publishers, 1996.

M. A. Fischler, J. M. Tenenbaum, and H. C. Wolf. Detection of roads and linear structures in low-resolution aerial imagery using a multisource knowledge integration technique. *Computer Graphics and Image Processing*, 15(3):201-223, March 1981.

S. R. Fleagle, M. R. Johnson, C. J. Wilbricht, D. J. Skorton, R. F. Wilson C. W. White, M. L. Marcus, and S. M. Collins. Automated analysis of coronary arterial morphology in cineangiograms: Geometric and physiologic validation in humans. *IEEE Transactions on Medical Imaging*, 8(4): 387-400, December 1989.

J. M. Gauch and S. M. Pizer. Multiresolution analysis of ridges and valleys in grey-scale images. *IEEE Transactions on Pattern Analysis and Machine Intelligence*, 15(6):635-646, June 1993.

M. Jacob and M. Unser. Design of steerable filters for feature detection using Canny-like criteria. *IEEE Transactions on Pattern Analysis and Machine Intelligence*, 26(8): 1007-1019, August 2004.

C. Kirbas and F. Quek. A review of vessel extraction techniques and algorithms. *ACM Computing Surveys*, 36(2): 81-121, June 2004.

A. K. Klein, F. Lee, and A. A. Amini. Quantitative coronary angiography with deformable spline models. *IEEE Transactions on Medical Imaging*, 16(5):468-482, October 1997.

V. Lang, A. G. Belyaev, I. A. Bogaevsici and T. L. Kunii. Fast algorithms for ridge detection In *Proceedings of the International Conference on Shape Modeling and Applications*, pages 189-197, Aizu-Wakamatsu, Japan, 3-6 Mar. 1997.

E. Meijering, M. Jacob, J.-C. F. Sarria, and M. Unser. A novel approach to neurite tracing in fluorescence microscopy images. In M. H. Hamza, editor, *Proceedings of the Fifth LASTED International Conference on Signal and Image Processing*, pages 491-495, Honolulu, USA, 13-15 Aug. 2003.

O. Monga, N. Armande, and P. Montesinos. Thin nets and crest lines: Application to satellite data and medical images. *Computer Vision and Image Understanding*, 67(3):285-295, September 1997.

R. C. Nelson. Finding line segments by stick growing. *IEEE Transactions on Pattern Analysis and Machine Intelligence*, 16(5):519-523, May 1994.

R. Nevatia and K. R Babu. Linear feature extraction and description. *Computer Graphics and Image Processing*, 13:257-269, 1980.

P. Ramm, Y. Alexandrov, A. Cholewinski, Y. Cybuch, R. Nadon, and B. J. Soltys. Automated screening of neurite outgrow. *Journal of Bimolecular Screening*, 8(1):7-18, February 2003.

P. Soille and H. Talbot. Directional morphological filtering. *IEEE Transactions on Pattern Analysis and Machine Intelligence*, 23(11):1313-1329, November 2001.

M. Sonka, M. D. Winniford, and S. M. Collins. Robust simultaneous detection of coronary borders in complex images. *IEEE Transactions on Medical Imaging*, 14(1):151-161, March 1995.

J. Staal, M. D. Abramoff, M. Niemeijer, M. A. Viergever, and B. van Ginneken. Ridge-based vessel segmentation in color images of the retina. *IEEE Transactions on Medical Imaging*, 23(4):501-509, April 2004.

C. Sun and B. Appleton. Multiple paths extraction in images using a constrained expanded trellis. *IEEE Transactions on Pattern Analysis and Machine Intelligence*, 27(12):1923-1933, December 2005.

Y. A. Tolias and S. M. Panas. A fuzzy vessel tracking algorithm for retinal images based on fuzzy clustering. *IEEE Transactions on Medical Imaging*, 17(2):263-273, April 1998.

G. Van de Wouwer, R. Nuydens, T. Meert, and B. Weyn. Automatic quantification of neurite outgrowth by means of image analysis. In J.-A. Conchello, C. J. Cogswell, and T. Wilson, editors, *Proceedings of SPIE, Three-Dimensional and Multidimensional Microscopy: Image Acquisition and Processing XI*, volume 5324, pages 1-7, July 2004.

F. Zana and J.-C. Klein. Segmentation of vessel-like patterns using mathematical morphology and curvature evaluation. *IEEE Transactions on Image Processing*, 10(7):1010-1019, July 2001.

Y. T. Zhou, V. Venkateswar, and R Chellappa. Edge detection and linear feature extraction using a 2-D random field model. *IEEE Transactions on Pattern Analysis and Machine Intelligence*, 11(1):8495, January 1989.

DISCLOSURE OF THE INVENTION

It is an object of the preferred embodiments of the invention to provide a new linear feature detection algorithm for image analysis and pattern recognition that requires low computational time to achieve a result.

In accordance with a first aspect of the present invention, there is provided a method of extracting linear features from an image, the method including the steps of: (a) applying a linear non maximum suppression (NMS) filter to the image at different angles to produce a series of filtered image responses; (b) combining the filtered image responses into a combined image having extracted linear features.

Preferably, the method also includes the steps of: preprocessing the images by low pass filtering the image and of preprocessing the image to remove areas of low local variances. The method can also include the step of removing small objects from the combined image. Further, the maximum suppression filter can comprise a linear filter or line filter. The linear filter (or line filter) can be a linear window directed at angle 0, 45, 90 and 135 degrees. The combining step can comprise forming the union of the filtered image responses. Preferably, the number of filtered image responses can be 4 although other numbers are also possible. The method can also include the step of: joining closely adjacent extracted linear features.

In embodiments, one or more post-processing steps are preferably performed either after or in conjunction with the application the non maximum suppression filter. The post processing steps preferably can include one or more steps selected from: a. removing the linear features that do not have a symmetric profile; b. removing the linear features that are preferably small; c. identifying the end points of the linear features; d. identifying and link the end points of the linear features; e. joining closely adjacent extracted linear features; f. thinning the linear features; and g. identifying a feature boundary for the linear features.

The preprocessing steps preferably can also include one or more steps selected from: a. inverting the image; b. converting colour pixels of the image to an intensity value; c. converting colour pixels of the image to grey scale; d. removing of areas of the image having low local variances; e. masking out areas the image having low local variances; f. smoothing the image; and g. low pass filtering the image. The maximum suppression filter can comprise a line filter. The line filter can be a linear window directed at angle 0, 45, 90 and 135 degrees, or at other angles. The combining can comprise forming the unification of the series of filtered images. In some embodiments, the image can be a three-dimensional structure.

In accordance with a further aspect of the present invention, there is provided an apparatus for extracting linear features from an image, including: an input means; a processing system; and an output means; wherein the processing system is coupled to the input means; wherein the processing system is coupled to the output means; wherein the processing system is configured to accept an input image from the input device; wherein the processing system is further configured applying a non maximum suppression filter to the input image to produce a series of filtered images; wherein the processing system is further configured to combine the series of filtered images into an output image having extracted linear features; the processing system is further configured to present the image having extracted linear features to the output means.

In some embodiments, the processing system can be further configured to perform one or more post-processing steps applied to the series of filtered images, wherein the one or more post-processing steps are preferably performed either after or in conjunction with the application of the non maximum suppression filter.

In some embodiments, the processing system can be further configured to perform one or more post-processing steps applied to the output image having extracted linear features, wherein the one or more post-processing steps are preferably performed either after or in conjunction with the combining the filtered images into an output image having extracted linear features.

BRIEF DESCRIPTION OF THE DRAWINGS

A preferred embodiment of the invention will now be described, by way of example only, with reference to the accompanying drawings in which:

FIG. 14 is a Table showing the computational running times of the NMS feature detection algorithm in seconds;

FIG. 15 is a Table showing the running times (in seconds) for different number of orientations of the NMS feature detection algorithm;

FIGS. 16 (b), (c) and (d) are the results form NMS linear feature detection performed using 2, 4, and 8 different orientations respectively;

PREFERRED EMBODIMENT OF THE INVENTION

Figure 1:
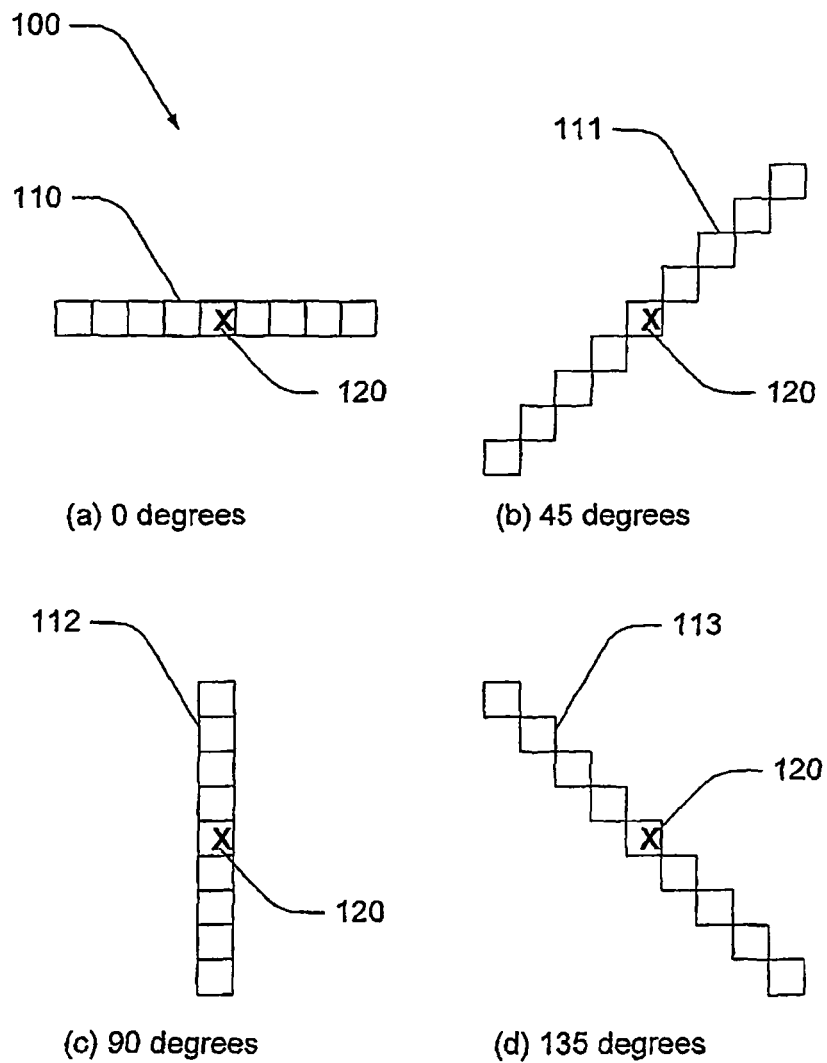
FIG. 1 is a graphical depiction of the linear feature detection filter windows used in the multiple NMS technique according to the invention.

The preferred embodiments of the invention provide a new algorithm for linear feature detection using multiple directional non-maximum suppression (NMS). This primarily involves NMS being applied to an image along multiple directions as defined by linear windows. Since there is no complicated filtering of the image involved, the algorithm is generally less computationally intensive than other methods.

Multiple Directional Non-Maximum Suppression

As described above, Hessian-based linear detection techniques or matched filters require a large amount of computational time and direct use of the image gradient is typically not very reliable. Instead of detecting the local direction of the linear features directly, the preferred embodiment detects the linear features by utilising the responses of multiple directional NMS.

Linear features are defined as a sequence of points where the image has an intensity maximum in the direction of the largest variance, gradient, or surface curvature. A directional local maximum is a pixel that is not surrounded by pixels of higher grey values (where the lowest grey value corresponds to black, and the highest grey value being white) in a linear window overlaid on the image. Linear features in the image may either correspond to local maximum or minimum in the grey value of the pixels and accordingly the linear feature may be bright (high grey value) or dark (low grey value) depending on the object property and the imaging techniques used. The following description of the preferred embodiments will describe the detection of bright linear features only for succinctness. It will be appreciated by those skilled in the art that dark features may be similarly detected by simply inverting the intensity of the input image, or using non-minimum suppression rather than non-maximum suppression. It will also be appreciated by those skilled in the art that colour images may be modified such that colours of interest are assigned a higher "grey value".

NMS is a process for marking all pixels whose intensity is not maximal within a certain local neighbourhood as zero and all pixels whose intensity is maximal within the same local neighbourhood as one. In this process, the pixels belonging to a local neighbourhood are selected using a series of linear windows, whereby the pixels are specified geometrically with respect to the pixel under test. $L_{D_i}$ is the result for non-maximum suppression in the direction D.

The outputs of directional non-maximum suppression are not greyscale images such as those obtained using most of the traditional directional filter methods, but rather, are binary images. The pixels of the binary image are each marked as 1 for the local directional maximum, and 0 (zero) otherwise.

Combining Multiple Directional Non-Maximum Suppression

Multiple NMS windows are applied and the union of the results from each window is constructed. To combine the outputs of the NMS images obtained at different angles, the following formula can be used:

$$L = \bigcup_{i=1}^{N_D} L_{D_i}$$

where $L_{D_i}$ is the result for non-maximum suppression in the direction $D_i$, $N_D$ is the number of directions used, and L is the combined result. The number of directions used, $N_D$, are typically 4, 8 or another multiple of 2.

FIG. 1 displays a series of four linear windows 100 that may be used in one embodiment of the present invention, wherein the pixel under test 120 is marked. These four exemplary linear windows 110 though 113 are constructed at angles of 0°, 45°, 90°, and 135° respectively, and where the position X corresponds to the pixel under test 120 of the linear window. Additional directions, such as those at 22.5°, 67.5°, 112.5° and 157.5° may also be used (not shown). All pixels in an image are visited by the NMS process. Also, a maximum along a linear window is kept only if it lies in the centre of the linear window 120.

Figure 2:
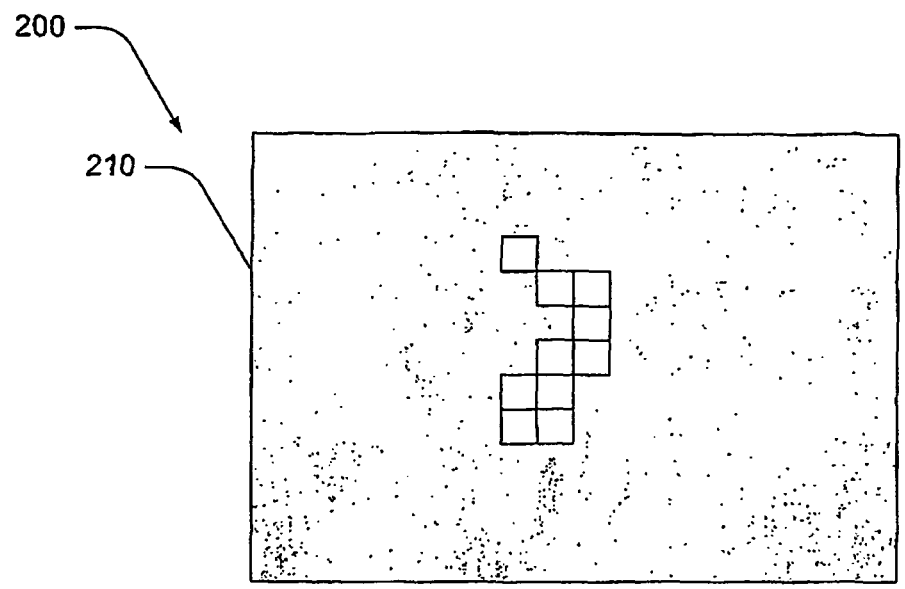
FIG. 2(a) is a simple sample image for linear feature detection.
FIGS. 2(b) and (c) are respectively the linear detection results of the NMS feature detection taken along a 45 degree and 0 degree directional orientations.
Figure 2:
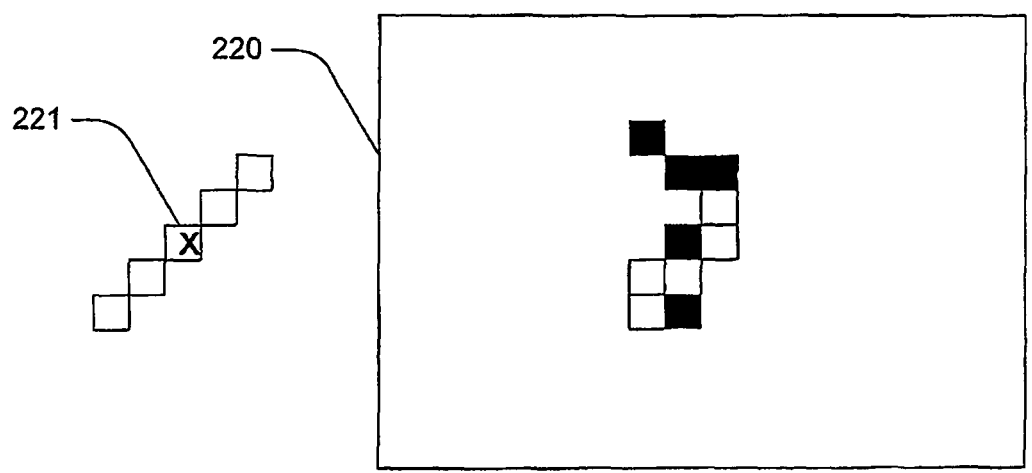
Figure 2:
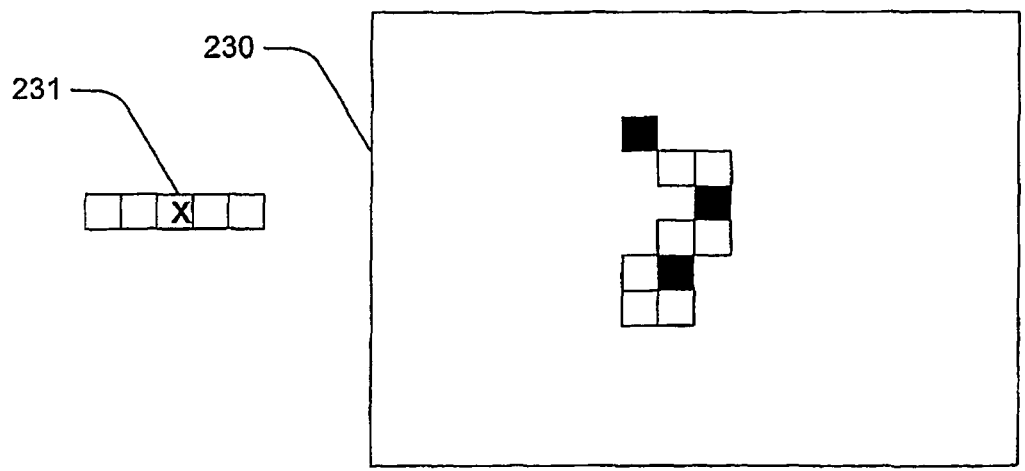

FIG. 2 displays a simple example of the application of only two directional NMS windows, 221 and 231, as applied to a tri-level image 210. The application of the first directional NMS windows 221 to the original image 210 produces Result A 220. The application of the second directional NMS windows 231 to the original image 210 produces Result B 230.

Figure 3:
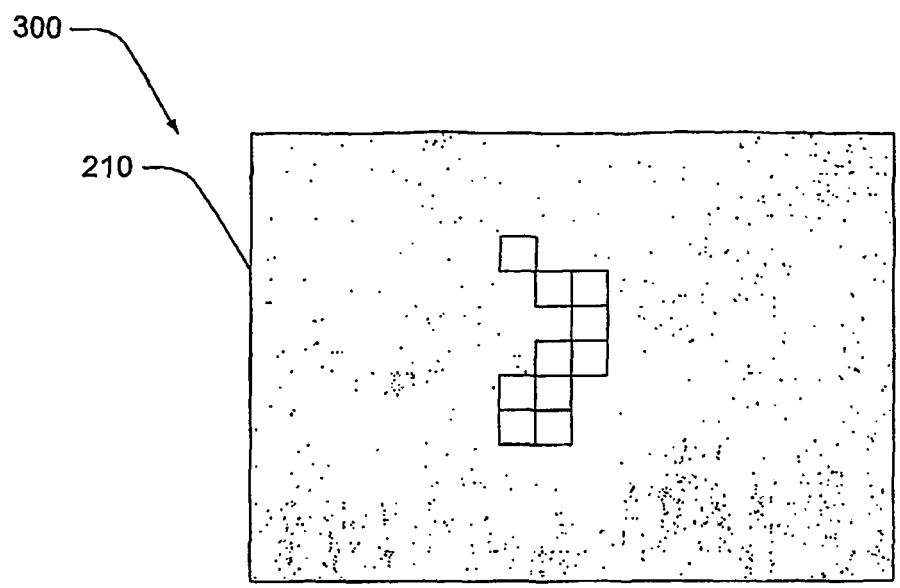
FIG. 3(a) is a simple sample image for linear feature detection.
FIG. 3(b) is the combined response resulting from the union of the of the NMS images of FIGS. 2(b) and (c)
Figure 3:
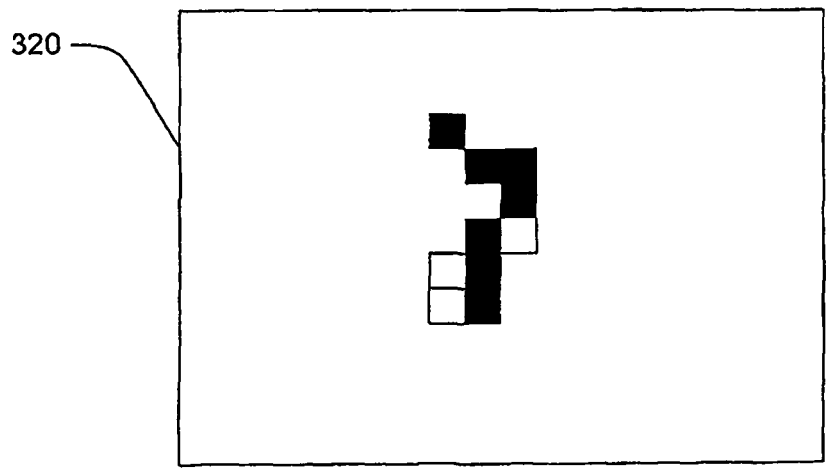

FIG. 3 displays the union of results 320 of the previous example, wherein only two directional NMS windows, 221 and 231 are applied to a tri-level image 210. The result for this example 320 is constructed from the union of Result A 220 and Result B 230.

Figure 4:
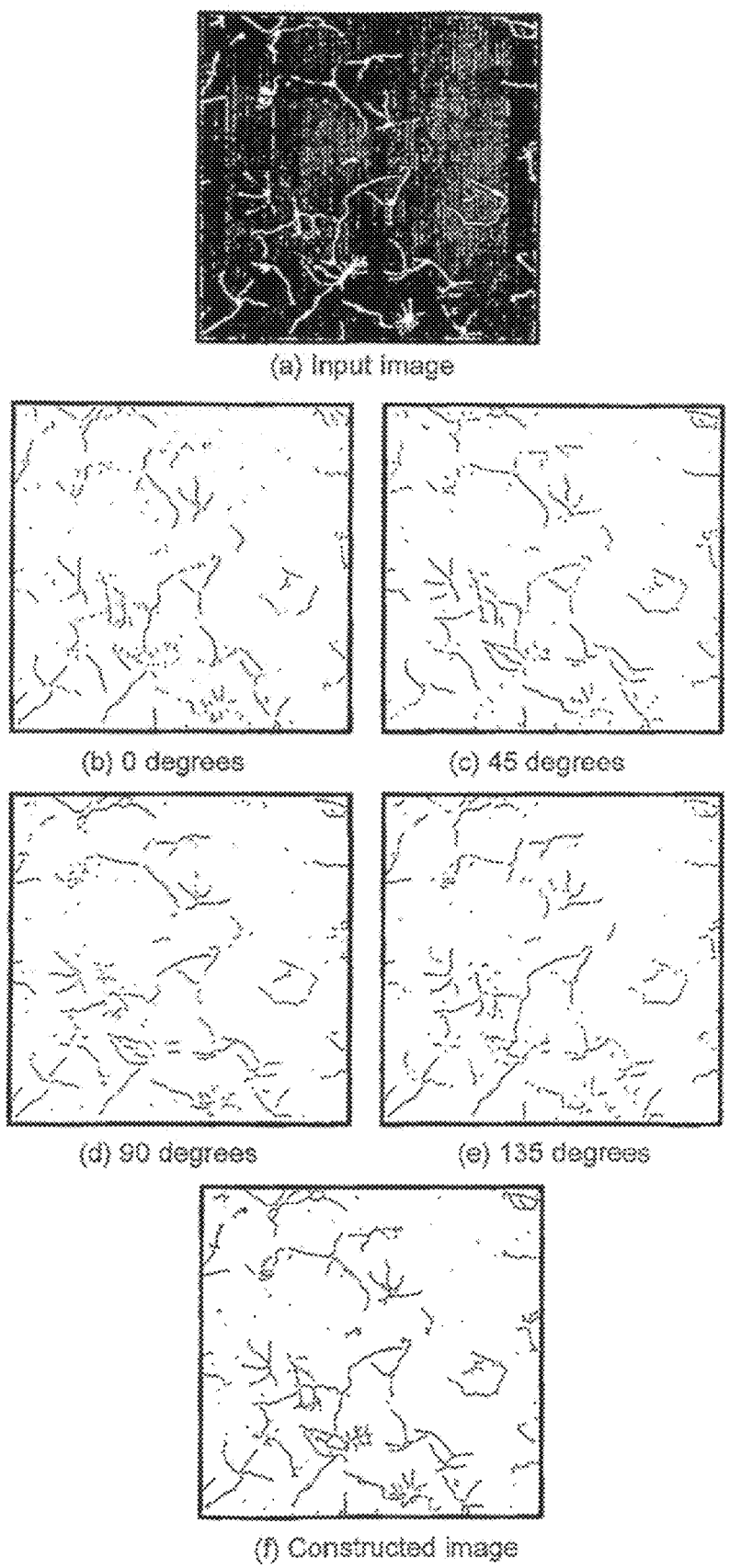
FIG. 4(a) is a sample image for linear feature detection.
FIGS. 4(b) to (e) are respectively the linear detection results of the NMS feature detection taken along 0, 45, 90 and 135 degree directional orientation.
FIG. 4(f) is the combined response resulting from the union of the of the NMS images of FIGS. 4(b) to (e)

FIG. 4 shows the NMS responses and the combined output as generated by the present invention. FIG. 4(*a*) shows the input image displaying nitrite outgrowths, to which NMS is applied. FIGS. 4(*b*) to (*e*) are the directional non-maximum suppression responses at angles 0°, 45°, 90°, and 135° respectively and using a linear window length of 11. FIG. 4(*f*) shows the union of the multiple NMS responses given in FIGS. 4(*b*) to (*e*).

FIG. 4(*f*) represents an output, where it can be seen that the linear features present in FIG. 4(*a*) are mostly shown in FIG. 4(*f*). The outputs of directional non-maximum suppression are not greyscale images such as those obtained using most of the traditional directional filter methods, but rather, are binary images. The pixels of the binary image are each marked as 1 for the local directional maximum, and 0 (zero) otherwise.

Fast Linear Feature Detection

Background Processing

A small amount of smoothing of the image may reduce the possibility of multiple pixels being detected as a local maximum during processing. The smoothing window is not to be chosen excessively large—as this would degrade the fine-scale features of the image to the extent that they are not detected. A small window, of size e.g. 3×3 pixels is generally sufficient. Smoothing of the image can be achieved though low pass filtering.

To increase the processing speed, it is also possible to estimate the local variance of a point in the image and mask out those points with low local variance since a point with a low variance within a local window is unlikely to be on a linear feature.

Symmetry Check

Figure 5:
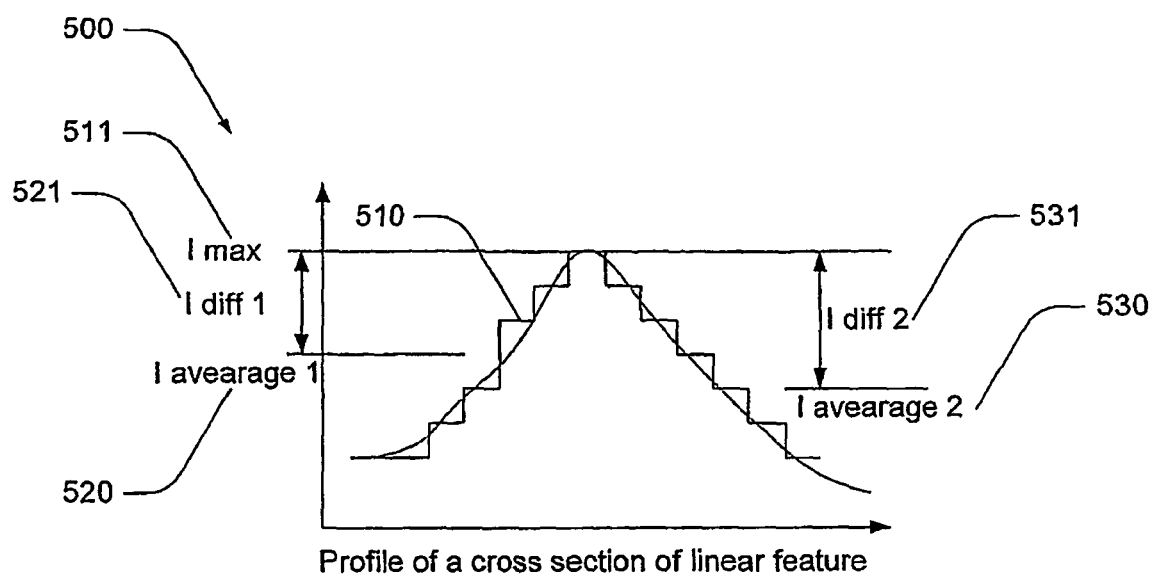
FIG. 5 represents an intensity profile along a linear window when examined across a linear feature.

It can generally be expected that the cross feature profile of a linear feature at a particular position in the image is near symmetrical around the maximum point. FIG. 5 illustrates the parameters that can be used for checking whether a local maximum lies on a linear feature in the image. The amplitudes of the pixels selected across a linear feature 510 are shown. $I_{max}$ 511 is the value of the local directional maximum. $I_{average1}$ 520 and $I_{average2}$ 530 are the average values of half windows on the two sides of the local maximum; and $I_{diff1}$ 521 and $I_{diff2}$ 531 are the differences between the maximum value and the two average values. For a linear feature in the image, both of the $I_{diff1}$ and $I_{diff2}$ values should be larger than a particular threshold value. If only one of the difference values is larger, the position of the local maximum resembles more like a step edge rather than a linear feature.

Figure 6:
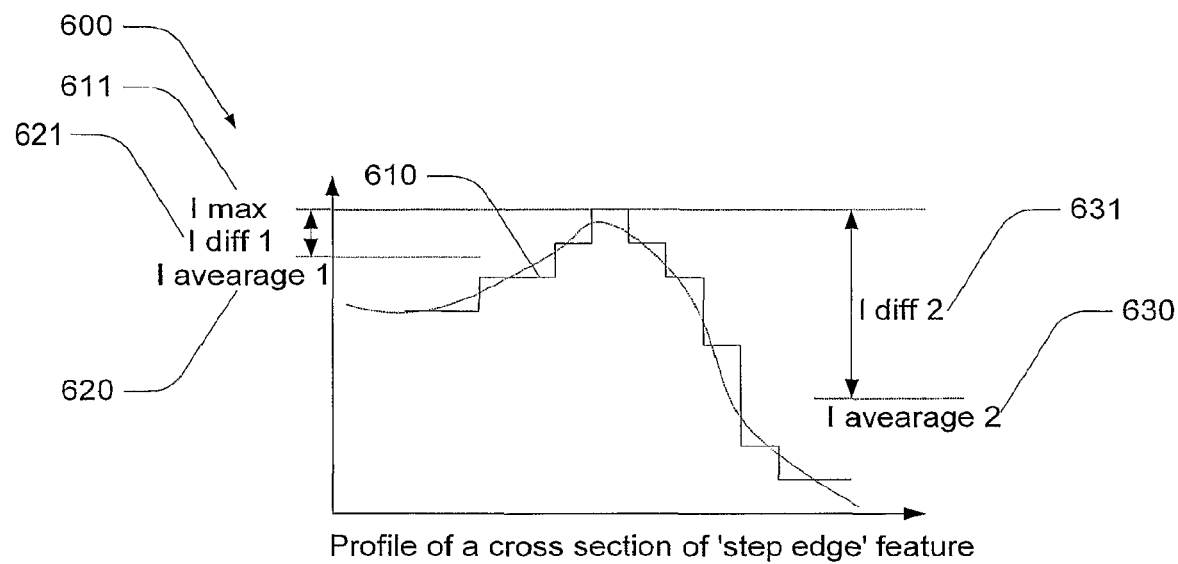
FIG. 6 represents an intensity profile along a linear widow when examined across a step feature.

FIG. 6 further illustrates the parameters that can be used for checking whether a local maximum lies on a linear feature in the image. The amplitudes of the pixels selected across a 'step edge' feature 610 are shown. $I_{max}$ 611 is the value of the local directional maximum. $I_{average1}$ 620 and $I_{average2}$ 630 are the average values of half windows on the two sides of the local maximum; and $I_{diff1}$ 621 and $I_{diff2}$ 631 are the differences between the maximum value and the two average values. For a 'step edge' feature in the image, one $I_{diff}$ values will be smaller than a particular threshold value. If only one of the difference values is larger, the position of the local maximum resembles more like a step edge rather than a linear feature.

Figure 7:
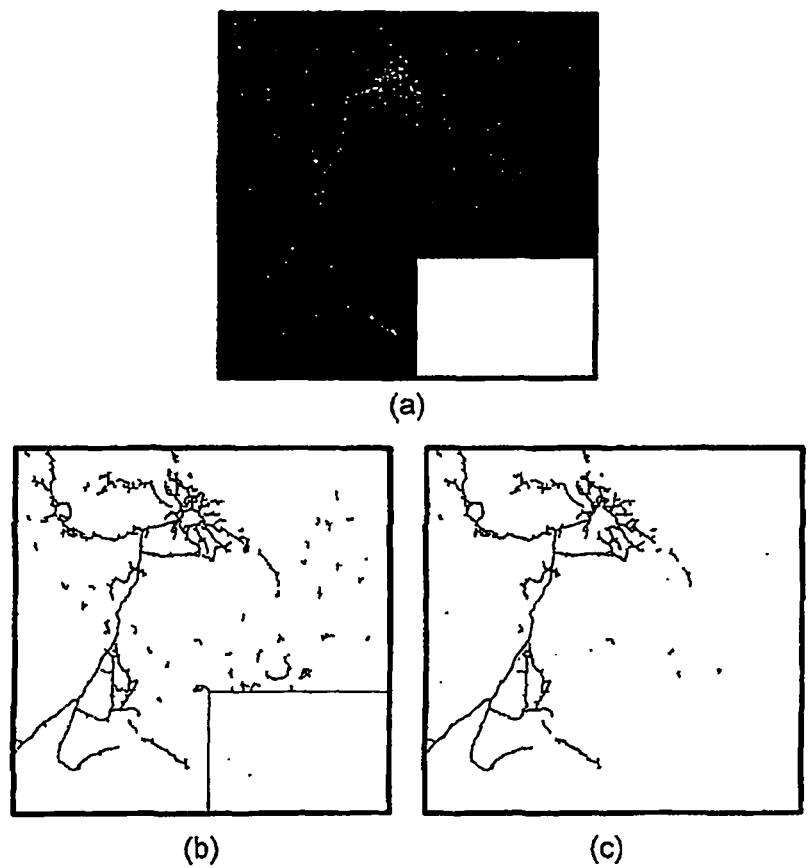
FIG. 7(a) is a sample image for linear feature detection.
FIGS. 7(b) and (c) are the results of NMS linear feature detection on the image of FIG. 7(a) with and without a symmetry check respectively.

FIG. 7 shows the effect of using a symmetry check especially to distinguish linear features from areas where step edges exist. FIG. 7(*a*) is the input image; FIG. 7(*b*) is the result without the symmetry check, and FIG. 7(*c*) is the result with symmetry check. The effect of not performing the symmetry check is that the resulting image contains increased edge output and spurious noise artefacts as can be seen by comparing FIG. 7(*b*) and FIG. 7(*c*).

Extending to Multiple Local Maximums

Figure 8:
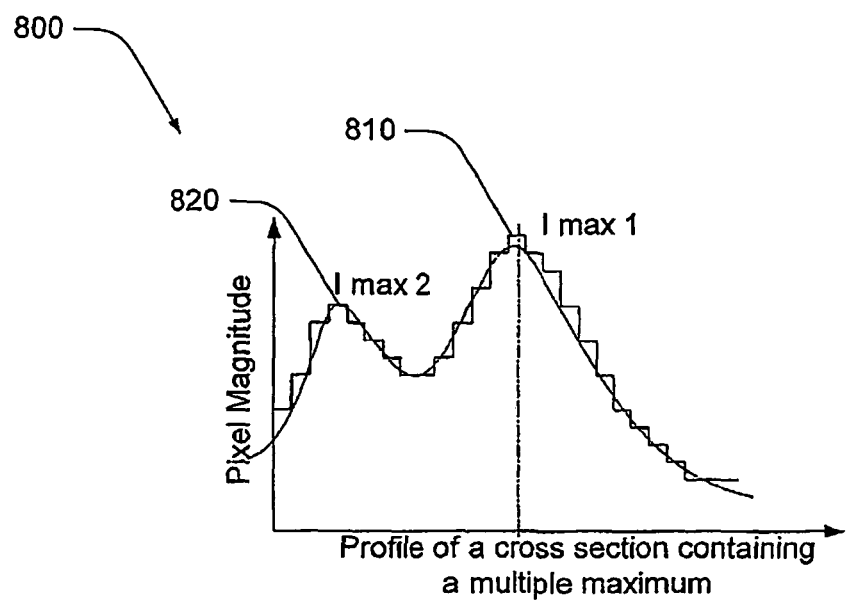
FIG. 8 illustrates a second intensity profine maximum along a linear window.

In some images, certain linear features may be very close to each other. The NMS process described above may detect only one of the two or several linear features that are next to each other. FIG. 8 shows an example where there are two local maxima 810, 820 along this linear window. Only the indicated centre peak 810 may be detected. The NMS process can be extended so that multiple local maxima can be detected for any particular linear window. Once a local maximum has been found at the centre of a linear window, a second or more local maxima within the same window can be searched so that for a particular linear window direction, multiple local maxima, hence multiple linear features, can be detected. FIG. 8 shows that a second local maximum 820 with intensity $I_{max2}$ can be found. One may also check that the intensity $I_{max2}$ should not be very different from $I_{max}$ for the secondary maximum to be retained.

Linking Broken Linear Features

The resulting image from the union of the NMS for linear features may occasionally present gaps in the detected linear features. To correct for these gaps, a linking process may be employed to connect the end points of neighbouring linear features with short line segments if the distance between end points is small.

The end points of linear features can be detected by first pruning the end points within a binary image. The difference between the pruned and the input binary images then provides the end points. A thinning operation may be carried out before the pruning step so that better end points on linear features may be obtained.

Figure 9:
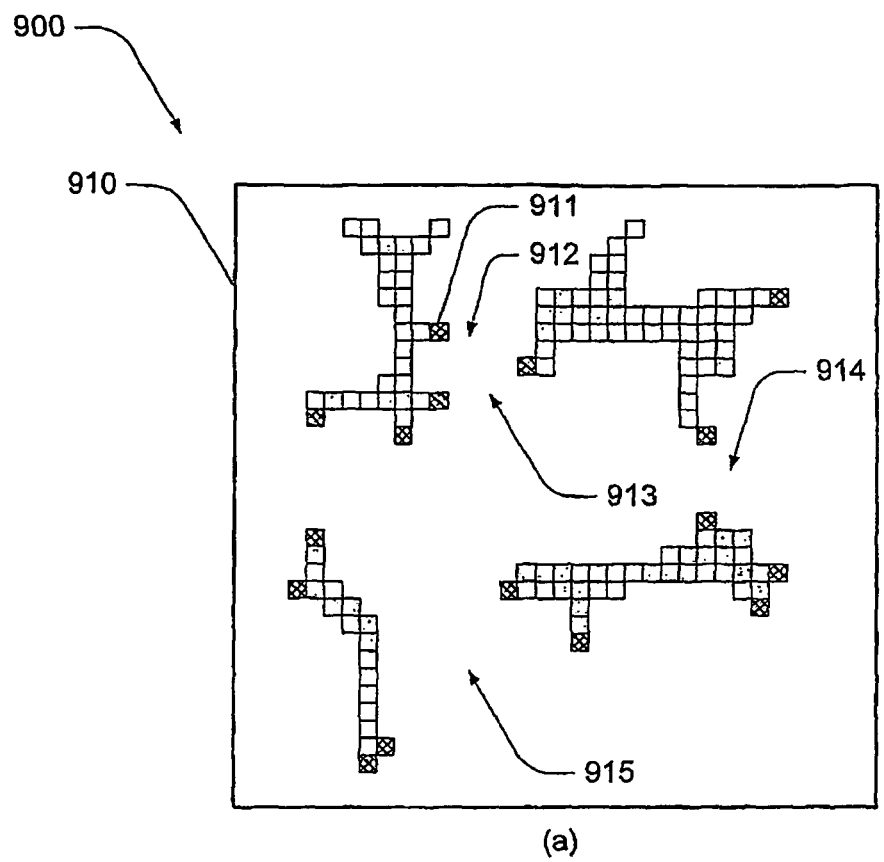
FIG. 9 shows the detection of gap linkage between the end points of the detected features.
Figure 9:
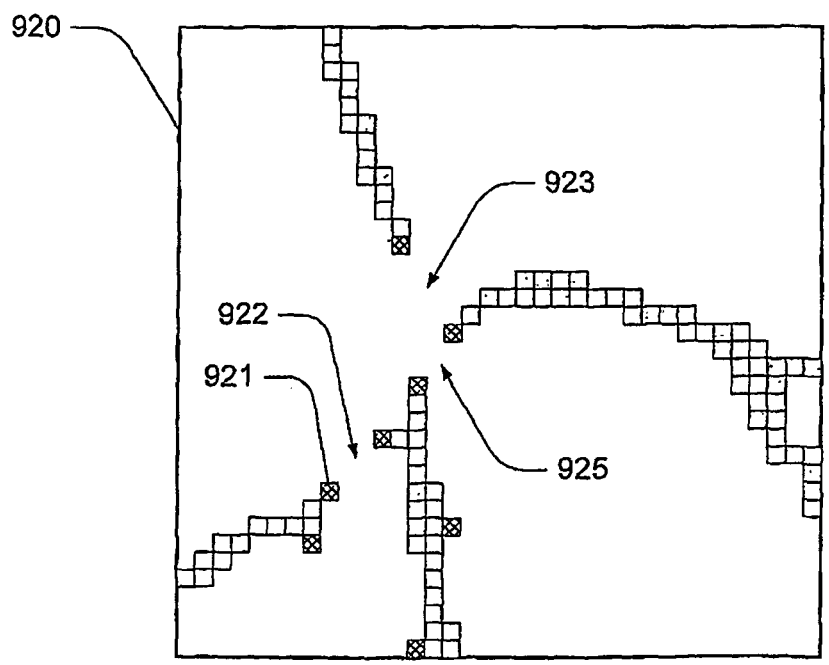

FIG. 9 shows two sub-regions of a binary image 910 and 920 with some end points on linear features marked, for example 911 and 921. FIG. 9 shows the sub-images contain gaps for a given linear feature, for example 912, 913, 914, 915, 922, 923, and 925.

The distance between the identified end points is then calculated. If the distance of end points is within a threshold and the end points belong to different linear features, a short line segment can be drawn to connect the two end points.

Figure 10:
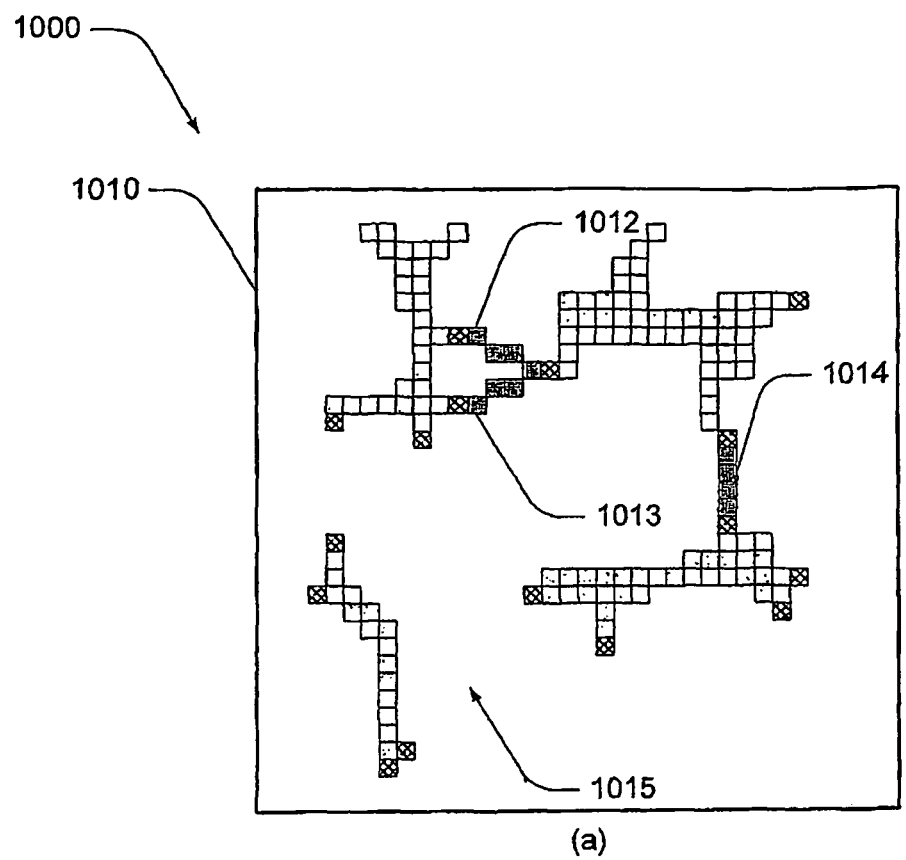
FIG. 10 shows the results of gap linkage between the end points of the detected features.
Figure 10:
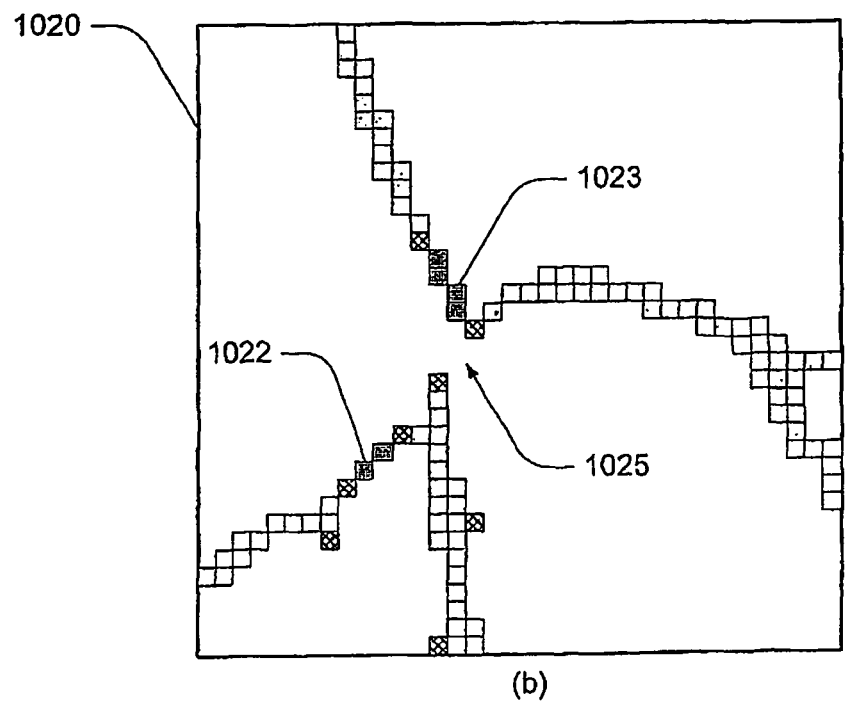

FIG. 10 shows two sub-regions of a binary image 1010 and 1020 with end points on linear features marked and that the sub-images contain gaps for a given linear feature. FIG. 10 shows two sub-images where some of the gaps have been connected with short line segments 1012, 1013, 1014, 1022 and 1023. Some gaps remain non-connected because each end point belonged to the same feature 1025 (the sub-image does not show the connection of the same feature), or the distance between the end points were larger than the threshold 1015.

For a pair of linear feature segments where each segment may have several end points detected, it is desirable to choose a best connection for the two segments using some of the end points that are close to each other. There may be several possible pairs of end points from the two segments to choose from. The connection can be chosen where the average image intensity on the connecting line segment is the maximum. Other information that can be used when selecting the best connection include the intensity values at the end points, the distance between the two connecting end points, the orientation information of each segment at each of the end points. While linking endpoints, the order with which this operation is carried out influences the final result: endpoints that have already been attributed in pairs are not free to be linked to another endpoint, even if the new link would result in a better overall outcome. By using a global optimization technique whereby all end-points are considered simultaneously using for example a graph-based algorithm, better results can be obtained.

Shortest path techniques may also be utilised to link linear features that have not been paired by the threshold process based on minimum distance. This is employed by ensuring that links between end points follow through the ridges of the detected linear features. The use of shortest path technique may add some cost to the feature detection process, but since the majority of the end points to be connected have already been connected by the distance threshold linking process, the additional processing time needed is typically minimal. Sometimes, it may be necessary to connect the end point of a linear feature to the middle of another linear feature, so that a "T" or "Y" shaped connection of two linear features can be made. In cases where there is a single pixel gap between neighbouring linear features but there is no end point on one of the features, this single pixel can be filled or linked.

Extension to 3D Images

Figure 11:
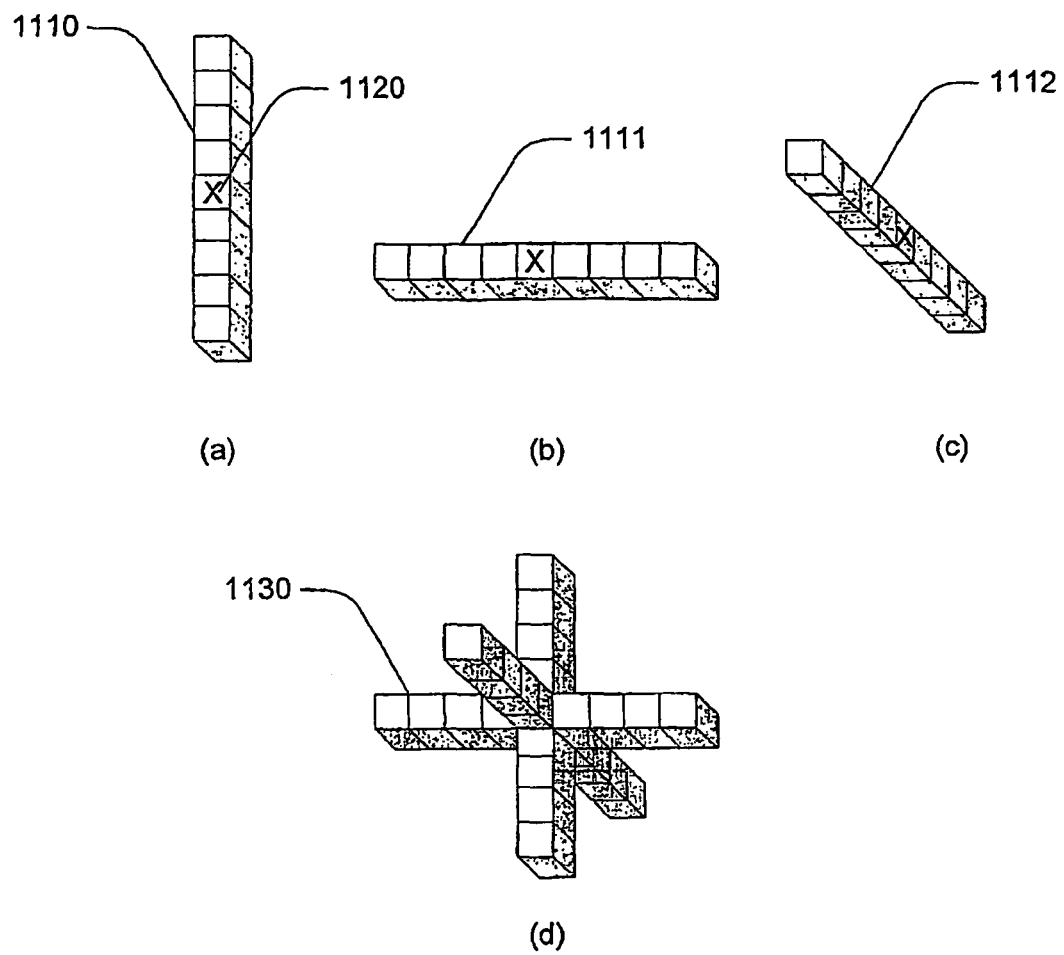
FIG. 11 and FIG. 12 illustrate an extension to 3-D linear windowing.
Figure 12:
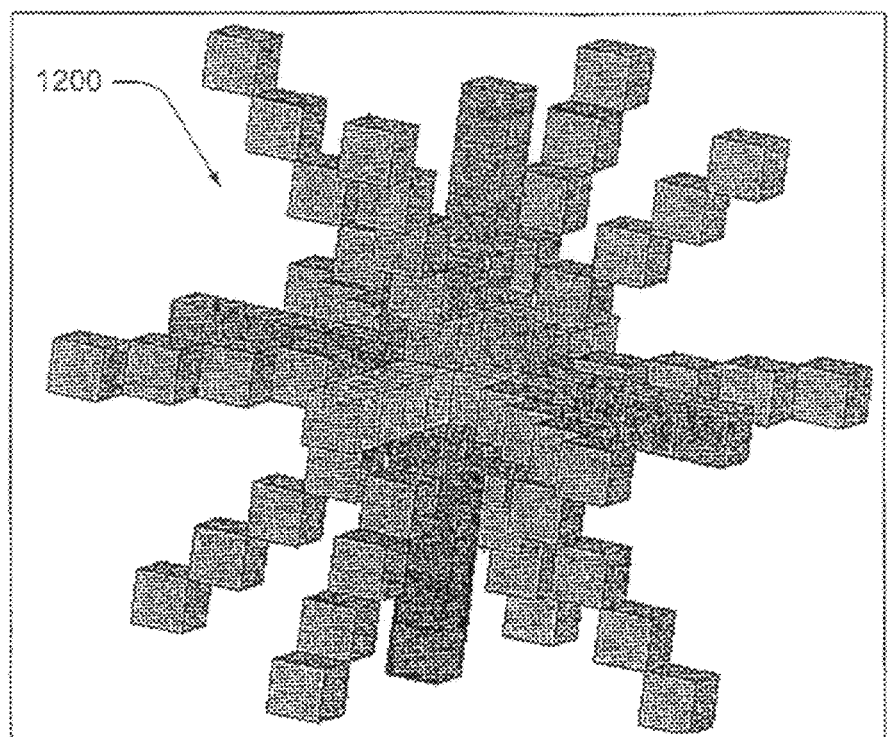

The algorithms developed above can be easily extended for 3D images. For 3D images, the linear windows used need to be oriented in 3D space. FIG. 11 shows an example of three 3D linear windows, 1110, 111, and 1112 of length 9 with their centre marked 1120. FIG. 11(*d*) shows the union of the three 3D linear windows 1130. FIG. 12 shows examples of the union of nine 3D linear windows 1200. It will be appreciated by those skilled in the art that additional directions in 3D space could also be used.

An input image may be stored in a three-dimensional representation in a three dimensional array or as a plurality of 2 dimensional slices. It will be appreciated by those skilled in the art that other configurations are suitable for storing an image in a three-dimensional representation.

Algorithm Steps

Figure 13:
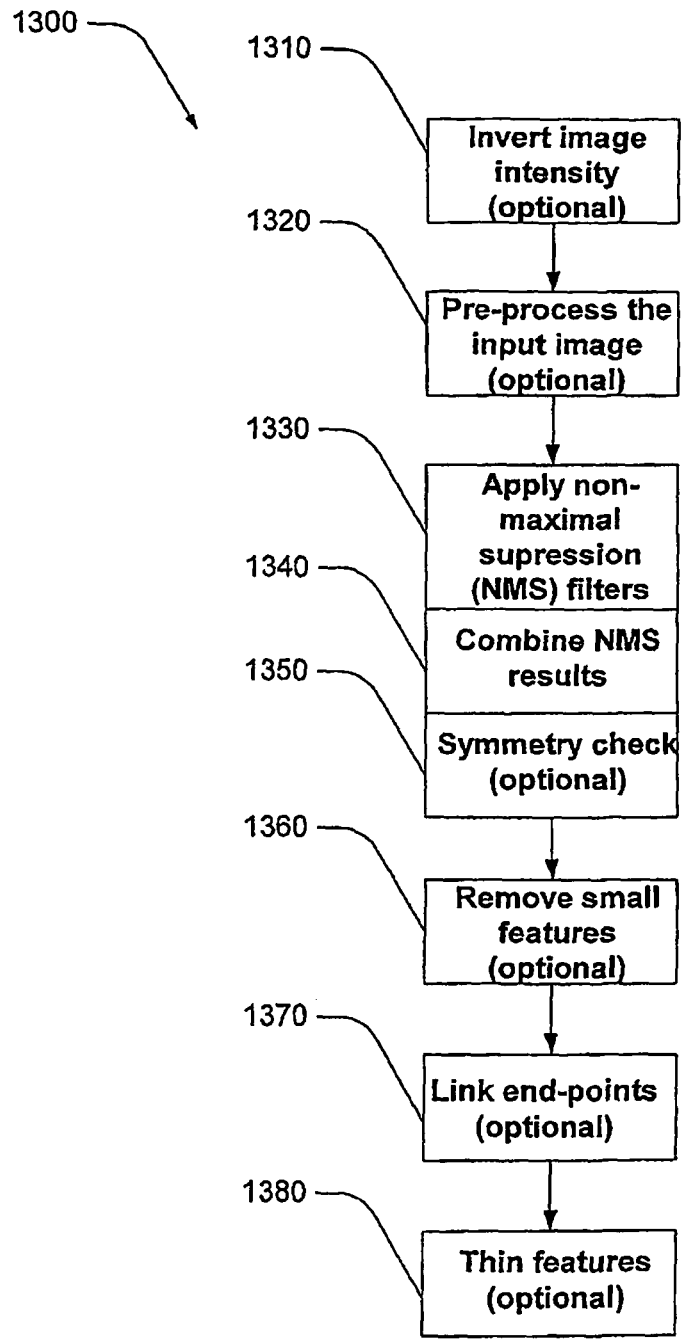
FIG. 13 represents a flow chart for one embodiment of the present invention.

The algorithm steps that may be included in the linear feature detection are represented in FIG. 13.

The steps of in the linear feature detection method 1300 can include:

1. Inversion of the image intensity, if necessary, for example when detecting dark linear features, 1310.
2. Pre-process the image including background extraction, creation of a low variance mask, and small window smoothing, 1320.
3. Carry out 4 or 8 (3 or 9 for 3D case) directional non-maximum suppression on the images obtained in Step 2, and only carry out non-maximum suppression on foregrounds 1330, and combine the multiple NMS outputs into one image 1340. The symmetry check is performed during the NMS process 1350. Multiple local maxima can also be found within a linear window.
4. Remove small features 1360.
5. Obtain and link the end points of different linear objects when the end points are close 1370.
6. Thin the obtained image if necessary 1380.

It will be appreciated by those skilled in the art that some of the above algorithm steps may be transposed or excluded.

Timings

The running time of the algorithm may depend on a number of factors. These factors include:

the threshold for background extraction;
the linear window size;
the number of linear windows used; and
the image contents.

If most regions of the image to be processed consists of relatively flat regions (in terms of the grey levels), then after the background extraction step of the algorithm, the number of remaining pixels surrounding the linear features of interest will be significantly reduced and the computational load will be correspondingly reduced.

The algorithm was tested on a variety of 8 bit images using a 2.40 GHz CPU Intel Pentium 4 computer running Linux. Colour input images were also tested, with only the intensity information being used for feature detection (individual channels of the colour image can also be used). The Table of FIG. 14 shows the running time in seconds, including image IO, of the NMS method on different sized images and compared with the running time for linear feature detection using a traditional ranked filter approach. It can be seen that the NMS algorithm is approximately 5 times faster than the ranked filter approach.

Figure 16:
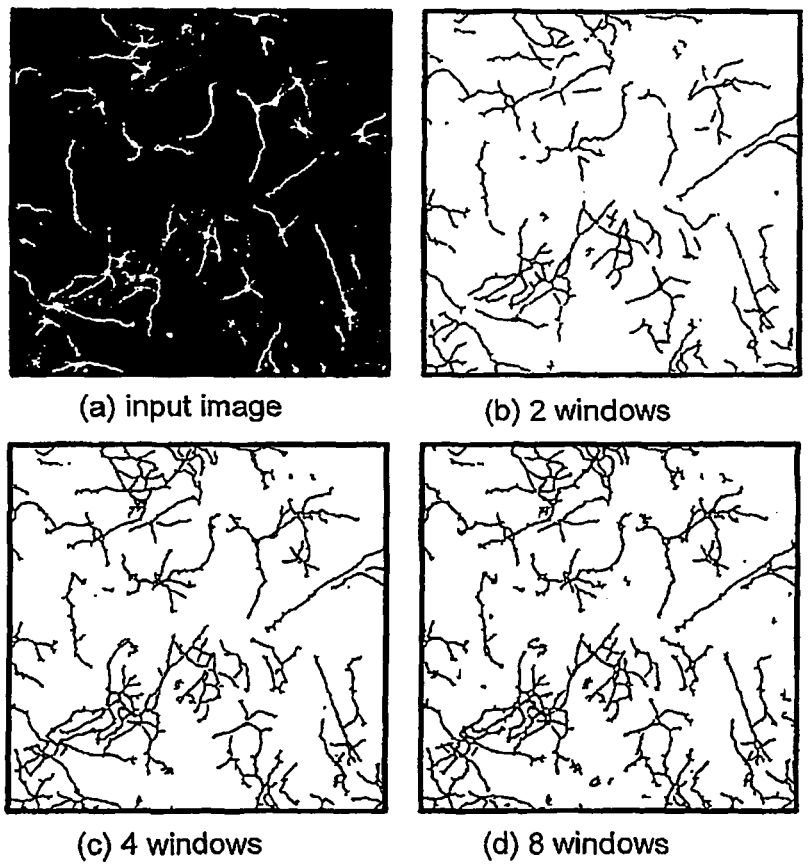
FIG. 16 (a) is a sample image for linear feature detection.

The Table of FIG. 15 gives the running times for the NMS algorithm with different number of orientations used. FIG. 15 shows that for increases in the number of orientations, there is an increased computational cost. FIG. 16 shows an example of the linear feature detection results achieved when using different number of orientation windows. FIG. 16(*a*) is the input image and FIG. 16(*b*), 16(*c*), and 16(*d*) are the results obtained with 2, 4, and 8 orientations respectively. FIG. 16 shows an increased number of orientations, associated with an increased computational cost, gives a superior feature connection thereby reducing the need for post-process linking.

The NMS linear detection algorithm is very fast compared with the fastest algorithms reported in the literature. The main step is applying the non-maximum suppression at a number of different directions—typically 4—along linear windows. There is no computationally intensive operation such as matched filters or curvature calculation and the algorithm only requires a minimum number of tuning parameters, such as the linear window size, the number of directions/orientations, the threshold for background extraction, the threshold for symmetry check the maximum gap size; and the size of small objects/artefacts in the image to be removed. Furthermore, the NMS algorithm is not sensitive to background variation since no global threshold is used and all operations are local, keeping computations to a minimum.

Figure 17:
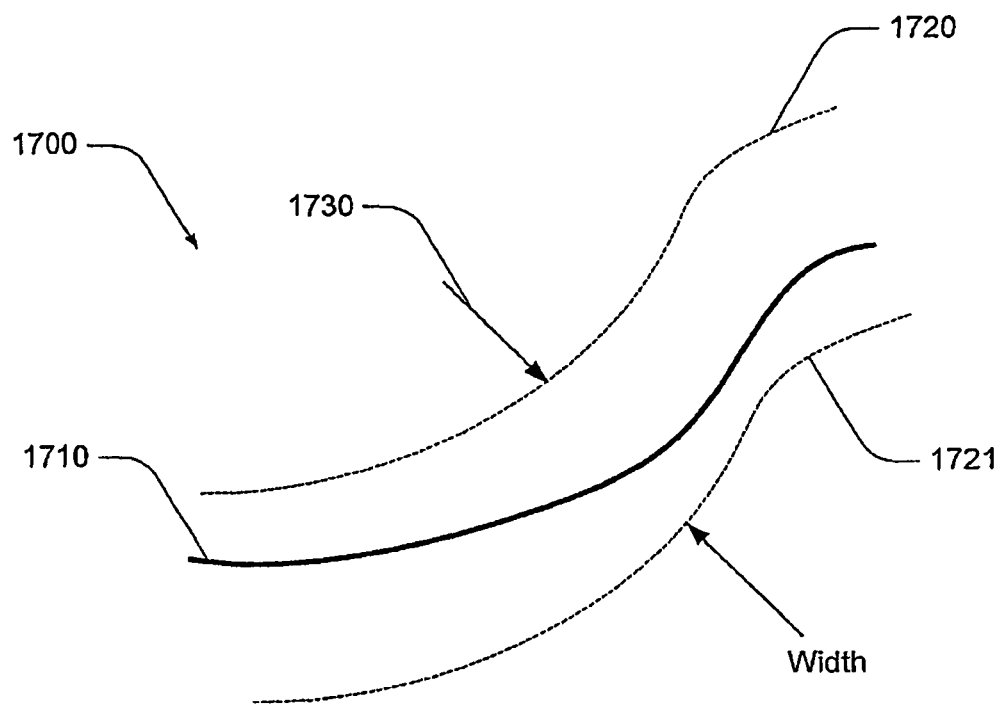
FIG. 17 illustrate an approach to obtain linear feature boundary.

The speed of the algorithm depends primarily on the content of the input images. If the intensity landscape is mostly flat, then the background estimation step will classify most regions of the image as background, resulting in a reduced amount of foreground pixels, that is, pixels close to linear features of interest that need to be processed. If a feature boundary is needed, extra steps are necessary to obtain the boundaries that can be used for width measurements. FIG. 17 shows the linear feature skeleton 1710 bounded by two constructed boundaries 1720 and 1721 separated by distance 1730. Shortest path or multiple paths techniques can be used for such purposes by first obtaining the linear feature skeleton 1710. Then, the gradient perpendicular to the linear feature can be calculated. The gradient values on the left and the right sides of the skeleton can be added together and a shortest path next to the skeleton can be found. Multiple paths methods may also be used to extract the linear feature boundaries as discussed in Sun and Appleton.

Figure 18:
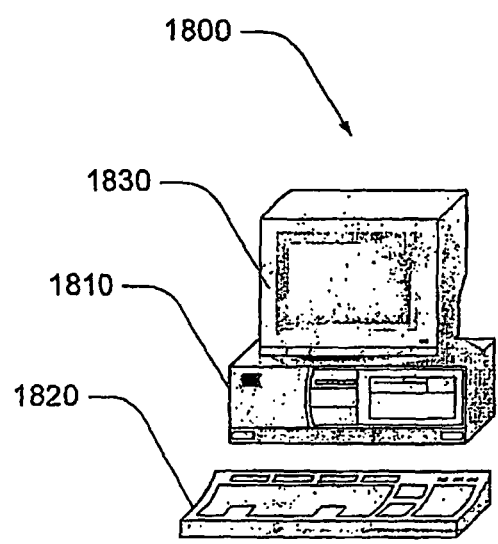
FIG. 18 shows and embodiment of a processing system configured to implement a method for extracting linear features from an image.

FIG. 18 shows an embodiment of a computer system 1800 used to implement a system for extracting linear features from an image, comprising a processing system 1810, keyboard as an input device 1820 and a monitor as an output device 1830. Further, the input image may be provided on a storage medium or via a computer network, input parameters may be pre-configured or entered at run time, the output image of linear features may be displayed on a monitor, saved to a storage medium or sent over a computer network. It will be appreciated by those skilled in the art that alternative or combinations of input devices or output devices are suitable for implementing alternative embodiments.

Figure 19:
FIGS. 19 to 22 are further examples of linear feature detection on a variety of sample images.
Figure 19:
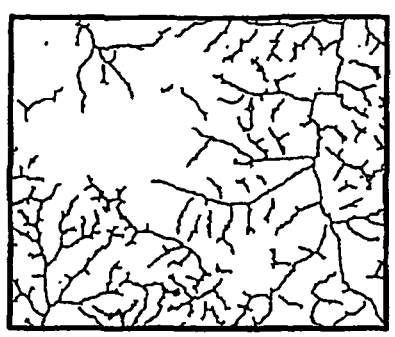
Figure 19:
Figure 19:
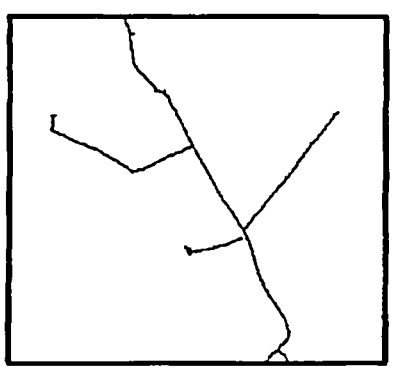
Figure 20:
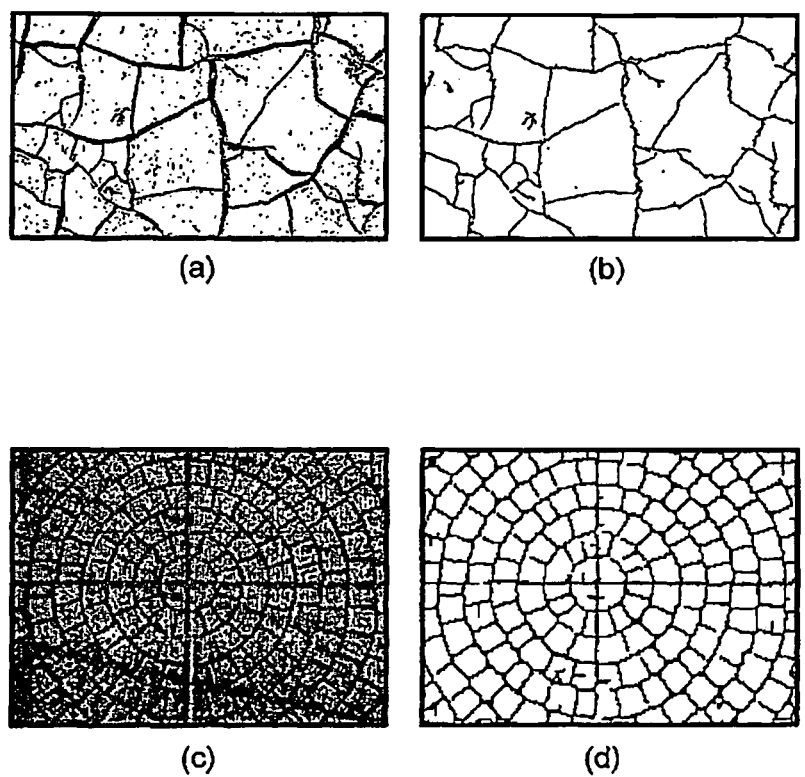
Figure 21:
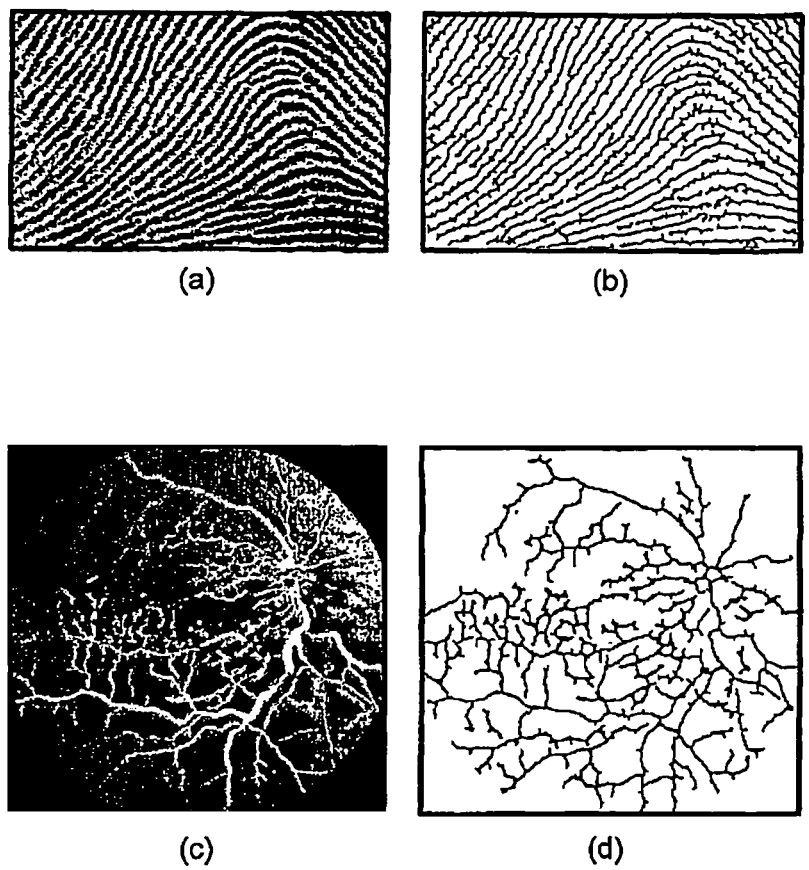
Figure 22:
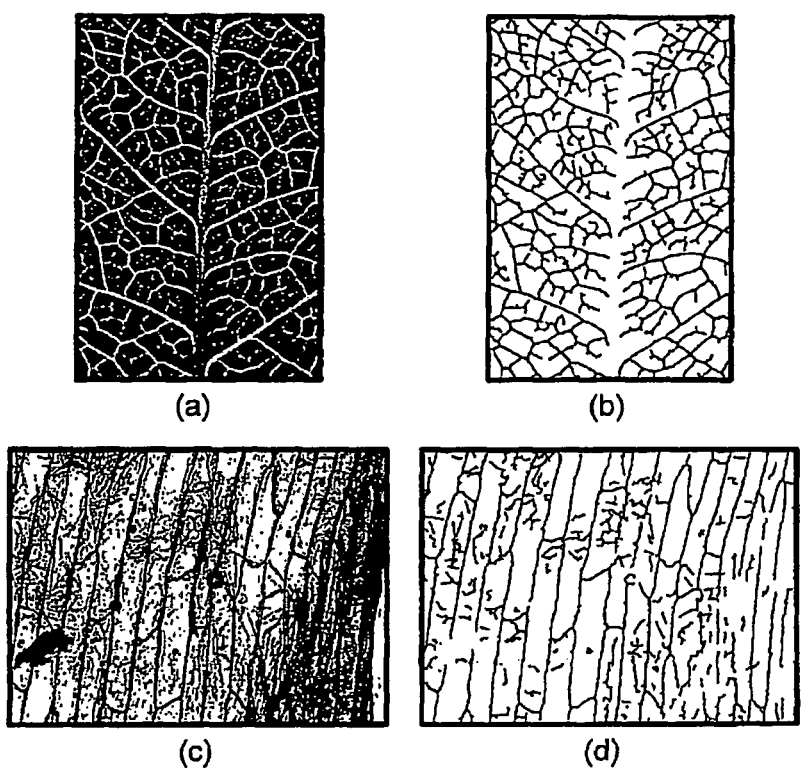

Further examples of the results obtained by the NMS linear detection feature algorithm can be seen in FIGS. 19 to 22. FIG. 19 shows the NMS linear detection feature algorithm when applied to aerial or satellite images is capable of extracting geographical features. FIG. 20 shows the NMS linear detection feature algorithm when applied to images of natural or constructed ground covering the algorithm is capable of extracting features. FIG. 21 shows the NMS linear detection feature algorithm applied to biological images in which it is capable of extracting information including biometric information. FIG. 22 shows the NMS linear detection feature algorithm applied to botanical images.

The linear feature detection method described herein, and/or shown in the drawings are presented by way of example only and are not limiting as to the scope of the invention. Unless otherwise specifically stated, individual aspects and components of the algorithm may be modified, or may have been substituted therefore known equivalents, or as yet unknown substitutes such as may be developed in the future or such as may be found to be acceptable substitutes in the future. The algorithm may also be modified for a variety of applications while remaining within the scope and spirit of the claimed invention, since the range of potential applications is great, and since it is intended that the present linear feature detection method be adaptable to many such variations.

The claims defining the invention are as follows:

1. A method for extracting linear features from an input image; the method including the steps of:
    for each of a plurality of different angles, applying a directional non maximum suppression filter to the input image to produce a corresponding plurality of respective filtered images; and
    combining the plurality of filtered images into an output image having extracted linear features.

2. A method as claimed in claim 1 further comprising the step of: preprocessing the input images by low pass filtering the input image.

3. A method as claimed in claim 1 further comprising the step of: preprocessing the input image to remove areas having low local variances.

4. A method as claimed in claim 1 further comprising the step of:
    removing small objects from the output image.

5. A method as claimed in claim 1 further when said maximum suppression filter comprises a line filter.

6. A method as claimed in claim 5 wherein said line filter is a linear window directed at angle 0, 45, 90 and 135 degrees, or at other angles.

7. A method as claimed in claim 1 wherein said combining comprises forming the unification of said plurality of filtered images.

8. A method as claimed in claim 1 wherein said combining comprises forming the union of said plurality of filtered images.

9. A method as claimed in claim 1 wherein the number of filtered images is at least 4.

10. A method as claimed in claim 1, wherein the number of filtered images is at least 8, or other number of windows.

11. A method as claimed in claim 1 further comprising the step of: joining closely adjacent extracted linear features.

12. A method as claimed in claim 1 further comprising one or more post-processing steps applied to said plurality of filtered images, wherein said one or more post-processing steps are performed either after or in conjunction with the application said non maximum suppression filter.

13. A method as claimed in claim 1 further comprising one or more post-processing steps applied to said output image having extracted linear features, wherein said one or more post-processing steps are performed either after or in conjunction with said combining the filtered images into an image having extracted linear features.

14. A method as claimed in claim 12 wherein said post-processing steps includes one or more steps selected from:
    (a) removing said linear features that do not have a symmetric profile;
    (b) removing said linear features that are small;
    (c) identifying the end points of said linear features;
    (d) identifying and link the end points of said linear features;
    (e) joining closely adjacent extracted linear features;
    (f) thinning said linear features; and
    (g) identifying a feature boundary for said linear features.

15. A method as claimed in claim 12 further comprising one or more pre-processing steps applied to said input image, wherein said one or more pre-processing steps are performed either after or in conjunction with said application of non maximum suppression filter.

16. A method as claimed in claim 15 wherein said pre-processing steps includes one or more steps selected from:
    (a) inverting said image;
    (b) converting colour pixels of said image to an intensity value;
    (c) converting colour pixels of said image to grey scale;
    (d) removing of areas of said image having low local variances;
    (e) masking out areas said image having low local variances;
    (f) smoothing said image; and
    (g) low pass filtering said image.

17. A method as claimed in claim 12 wherein said maximum suppression filter comprises a line filter.

18. A method as claimed in claim 17 wherein said line filter is a linear window directed at angle 0, 45, 90 and 135 degrees, or at other angles.

19. A method as claimed in claim 12 wherein said combining comprises forming the unification of said plurality of filtered images.

20. A method as claimed in claim 12 wherein said combining comprises forming the union of said plurality of filtered images.

21. A method as claimed in claim 12 wherein the number of said filtered images is at least 4.

22. A method for extracting linear features from an image as claimed in claim 12 wherein the number of said filtered images is at least 8.

23. A method as claimed in claim 12 wherein said input image is a grey scale image.

24. A method as claimed in claim 12 wherein said input image is a colour image.

25. A method as claimed in claim 1 wherein said input image is three-dimensional.

26. A method as claimed in claim 1 wherein said input image is stored in a three-dimensional representation.

27. A method as claimed in claim 1 wherein said maximum suppression filter is three-dimensional.

28. A method as claimed in claim 17 wherein said line filter is three-dimensional.

29. An apparatus for extracting linear features from an input image, including:
an input means;
a processing system; and
an output means,
wherein the processing system is coupled to the input means; wherein the processing system is coupled to the output means; wherein the processing system is configured to accept said input image from the input device; wherein the processing system is further configured to apply, for each of a plurality of different angles, a non maximum suppression filter to said input image to produce a corresponding plurality of respective filtered images;
wherein the processing system is further configured to combine the plurality of filtered images into an output image having extracted linear features; the processing system is further configured to present the image having extracted linear features to the output means.

30. An apparatus for extracting linear features from an image as claimed in claim 29, wherein the processing system is further configured to perform one or more post-processing steps applied to said plurality of filtered images, wherein said one or more post-processing steps are performed either after or in conjunction with the application of said non maximum suppression filter.

31. An apparatus for extracting linear features from an image as claimed in claim 29, wherein the processing system is further configured to perform one or more post-processing steps applied to said output image having extracted linear features, wherein said one or more post-processing steps are performed either after or in conjunction with said combining the filtered images into an output image having extracted linear features.

32. An apparatus for extracting linear features from an image as claimed in claim 29 wherein the processing system is further configured to perform one or more pre-processing steps applied to said input image, wherein said one or more pre-processing steps are performed either before or in conjunction with said application of non maximum suppression filter.

33. An apparatus for extracting linear features from an image as claimed in claim 29 wherein said maximum suppression filter comprises a line filter.

34. An apparatus for extracting linear features from an image as claimed in claim 33 wherein said line filter is a linear window directed at angle 0, 45, 90 and 135 degrees, or at other angles.

35. An apparatus for extracting linear features from an image as claimed in claim 29 wherein said combining of the plurality of filtered images comprises forming the union of said plurality of filtered images.

36. An apparatus for extracting linear features from an image as claimed in claim 29 wherein the number of said filtered images is at least 4.

37. An apparatus for extracting linear features from an image as claimed in claim 29 wherein the processing system is further configured to process a grey scale input image.

38. An apparatus for extracting linear features from an image as claimed in claim 29 wherein the processing system is further configured to process a colour input image.

39. An apparatus for extracting linear features from an image as claimed in claim 29 wherein said input image is stored in a three-dimensional representation.

40. An apparatus for extracting linear features from an image as claimed in claim 29 wherein said input image is three-dimensional.

41. An apparatus for extracting linear features from an image as claimed in claim 29 wherein the non maximum suppression filter is three dimensional.

42. An apparatus for extracting linear features from an image as claimed according to claim 33 wherein the line filter is three dimensional.

* * * * *